United States Patent [19]
Hodges

[11] Patent Number: 5,653,634
[45] Date of Patent: Aug. 5, 1997

[54] ELECTRONIC NUMERICAL SPORTS PLAYER IDENTIFIER

[76] Inventor: D. Lee Hodges, 154 Fairmont Dr., Mountain Brook, Ala. 35213

[21] Appl. No.: 337,112

[22] Filed: Nov. 10, 1994

[51] Int. Cl.⁶ .................................................. A63F 9/24
[52] U.S. Cl. ................................................ 463/1; 364/410
[58] Field of Search .................... 463/1, 43; 364/410, 364/411; 273/460, 461

[56] References Cited

U.S. PATENT DOCUMENTS

| | | | |
|---|---|---|---|
| 4,639,225 | 1/1987 | Waihizuka | 463/43 X |
| 4,890,229 | 12/1989 | Rudnick | 364/410 |
| 4,977,503 | 12/1990 | Rudnick | 364/410 |
| 5,153,826 | 10/1992 | Johnson | 364/410 |
| 5,377,982 | 1/1995 | Villarreal | 273/148 R |

*Primary Examiner*—Jessica Harrison
*Assistant Examiner*—Michael O'Neill
*Attorney, Agent, or Firm*—Veal & Associates

[57] ABSTRACT

A hand-held electronic sports data retrieval device that accesses sports player names and other biographical information based upon inputting a player's number. The unit contains all of the current season's biographical sports player data, organized by team, and also contains the individual team's schedules. Top level user system operations are simplified by allowing the user to switch from one function mode to another directly and without going through any intermediate steps. The unit is desired to be extremely low cost, and all biographical data is kept current by downloading current information into a field programmable memory chip and inserted into the unit prior to shipment. A real time clock within the device sets schedule parameters upon unit initialization.

31 Claims, 12 Drawing Sheets

FIG. 1

FIG. 2A — THE LINEUP

FIG. 2B — HOME OR OPPONENT?

FIG. 2C — 00 HOME TEAM NUMBER?

FIG. 2D — 02 BILL    AFC-EAST

FIG. 2E — ENTER PLAYER NUMBER

FIG. 2F — 12 HOME/OPP    PLAYER?

FIG. 2G — 12 JIM KELLY    H

FIG. 2H — 12 QUARTERBACK    H

FIG. 2I — 34 RUNNING BACK    H

FIG. 2J — 34 THURMAN THOMAS    H

ELECTRONIC NUMERICAL SPORTS PLAYER IDENTIFIER

FIELD OF INVENTION

The current invention relates to the retrieval of biographical sports data on sports athletes. More particularly, it relates to a hand-held, calculator style data retrieval unit which can quickly and easily retrieve the names and other relevant biographical information on a currently active sports player based upon their uniform number.

BACKGROUND OF THE INVENTION

Typically, a sports enthusiast viewing a sports event buys a player program or roster to obtain names and other biographical information regarding the players of a team. The enthusiast can, at his/her convenience, also compare one player's biographical information with a competitor's. Since a program or roster is usually printed just before game time, this biographical information is usually both current and accurate. The availability of biographical information enhances an enthusiast's viewing experience.

However, wide television coverage of sports events has removed a large segment of the viewing crowd from the live arena area where programs are traditionally sold. In addition, today's player programs do not necessarily provide the easiest access to player names or biographical data. The program has become largely an advertising tool. Program formats are not geared to provide swift access to player information especially during a rapidly moving game, but usually are designed to bury the data so that the user will be forced to view as many advertisements as possible.

Some electronic devices exist which provide access to sports data in various formats. Typical of these devices are U.S. Pat. Nos. 4,977,503 and 4,890,229, issued to Rudnick, et al. Rudnick discloses a sports information retrieval device which displays statistics on a player's cumulative past performance. A user is required to enter the name of a particular player or team via an alphabetic keyboard and, once a match is made with the device's memory, the previous or past year's statistics on a particular player's performance are displayed. While Rudnick's devices allow for retrieval of limited data regarding a particular player, the retrieval steps are optimized principally for statistical data retrieval on a specific team or player (e.g., cumulative lifetime batting average, etc.). More importantly, the additional electronics and programming code required for name matching increases the complexity and cost of the device.

Other information retrieval devices exist which utilize searching algorithms to retrieve data from inexact input queries. U.S. Pat. No. 4,830,618, issued to David, discloses a self contained electronic spelling machine. A predetermined location indicia in the input word provides an exact matrix check with every word in the dictionary in memory. The user inputs letters corresponding to a presupposed spelling of a word and the device corroborates the word's spelling or provides the word that most closely matches the inputted pattern. Similarly, U.S. Pat. No. 5,007,019, issued to Squillante et al., discloses a combined dictionary/thesaurus unit whose operation is similar to David's device. Finally, Hardy et al., under U.S. Pat. No. 5,203,705, discloses a spelling education hand-held device that validates the spelling of an inputted word or refers the user to a printed dictionary supplied with the unit, and U.S. Pat. No. 4,891,775, issued to McWherter, shows an electronic word game machine that uses a random number generator to select and display a random word upon demand.

In the electronic hand-held games area, U.S. Pat. No. 4,395,760, issued to Soski and Levine, discloses an electronic baseball game, and U.S. Pat. No. 4,582,323, issued to Minkoff and Oliphant, shows an electronic football game. These devices entertain a user by responding to a user's real-time inputs geared toward a game goal, and the devices use internally stored data to influence the device's response to the user's inputs.

Though the above referenced devices disclose electronic hand-held data retrieval devices, of which there are many, none of these devices specifically retrieves a player's name or current biographical data regarding that player as provided in a standard game program whether televised or at a live arena. Nor do any such devices retrieve current player names or specific biographical information solely by reference to individual player numbers. Furthermore, these devices require some initial knowledge of the requested record, several sequences of steps are required to retrieve the statistical data, and the data displayed is not current, but compiled.

A strong industry need exists for a small electronic hand-held device that can quickly retrieve and display current player biographical data by reference to jersey number without inputting the player's name or team. The device must be a small calculator size unit, it should be very low cost, and contain a minimum of input buttons, and input sequences.

SUMMARY OF THE INVENTION

It is the object of the present invention to provide a simple, hand-held electronic device containing current with retrievable biographical sports data.

A further object of the present invention is to allow a user to easily retrieve the name and other relevant biographical sports data on a player by knowing only a player's assigned number on the team, which usually corresponds to a player's jersey number.

Another object is to simplify and minimize keypad input operations so that the retrieval unit is readily intuitive to the first-time or technically impaired user.

Still another object for the device is to provide a real-time clock within the electronics of the unit to automatically update team scheduling functions.

A further object of the present invention is to utilize a field programmable computer chip that contains the unit's biographical player data that can be downloaded with the most recent biographical data prior to insertion into the retrieval unit's electronics.

The final object of the present invention is to provide up-to-date team schedules, including dates and times of games, for the current season of all teams contained in the unit.

There has thus been outlined, rather broadly, the more important features of the invention in order that the detailed description thereof that follows may be better understood, and in order that the present contribution to the art may be better appreciated. There are, of course, additional features of the present invention that will be described hereinafter and which will form the subject matter of the claims appended hereto. In this respect, before explaining the invention in detail, it is to be understood that the invention is not limited in its application to the details set forth in the following description or illustrated in the drawings. The invention is capable of other embodiments and of being practiced and carried out in various ways and utilized in a number of sports. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other methods and systems for carrying out the several purposes of the present invention. It is important, therefore, that the claims be regarded as including such equivalent systems insofar as they do not depart from the spirit and scope of the present invention.

DESCRIPTION OF A PREFERRED EMBODIMENT

Figure 1:
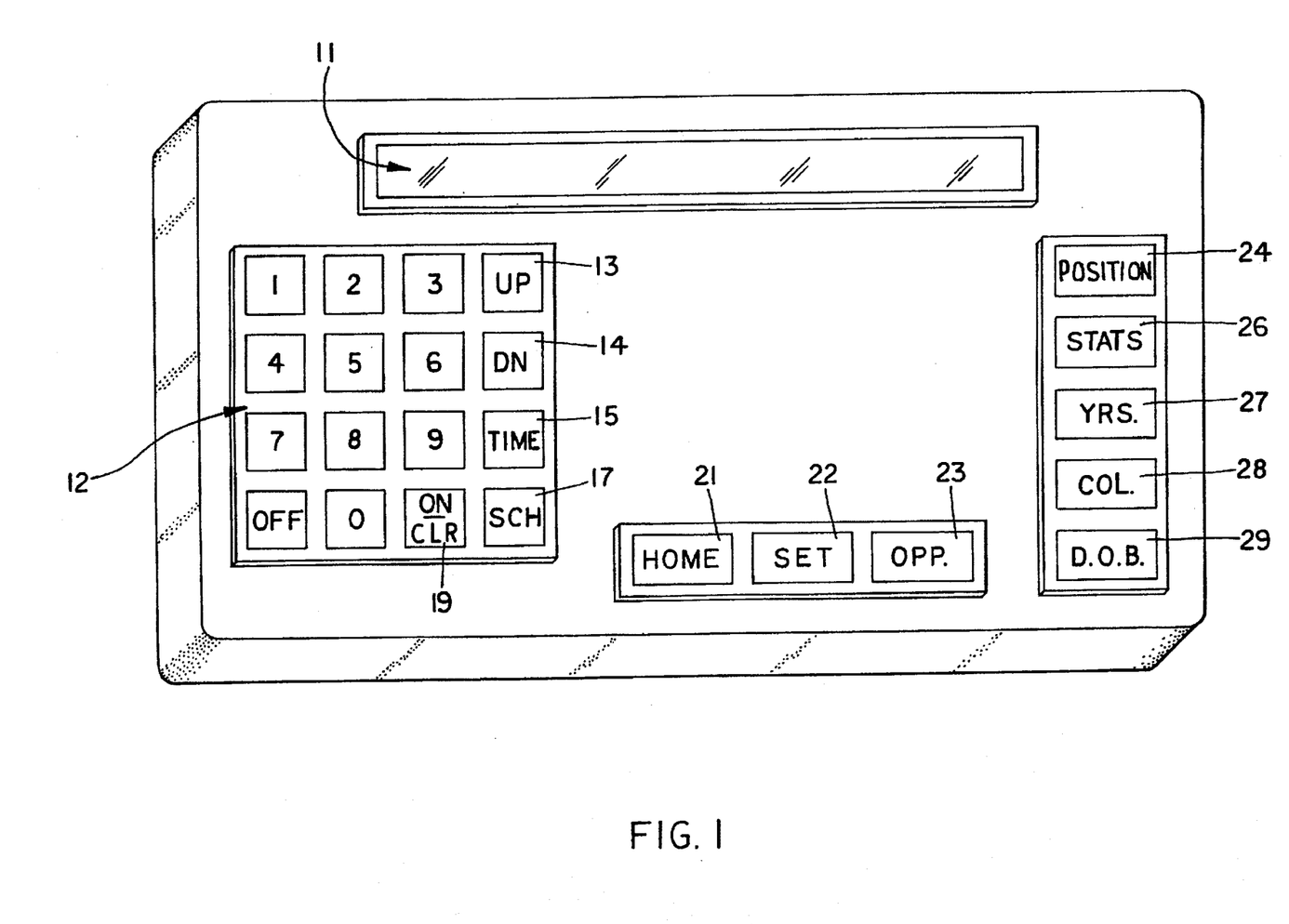
FIG. 1 is a pictorial illustration of the retrieval unit's face and functional keys in a preferred embodiment.
Figure 3A:
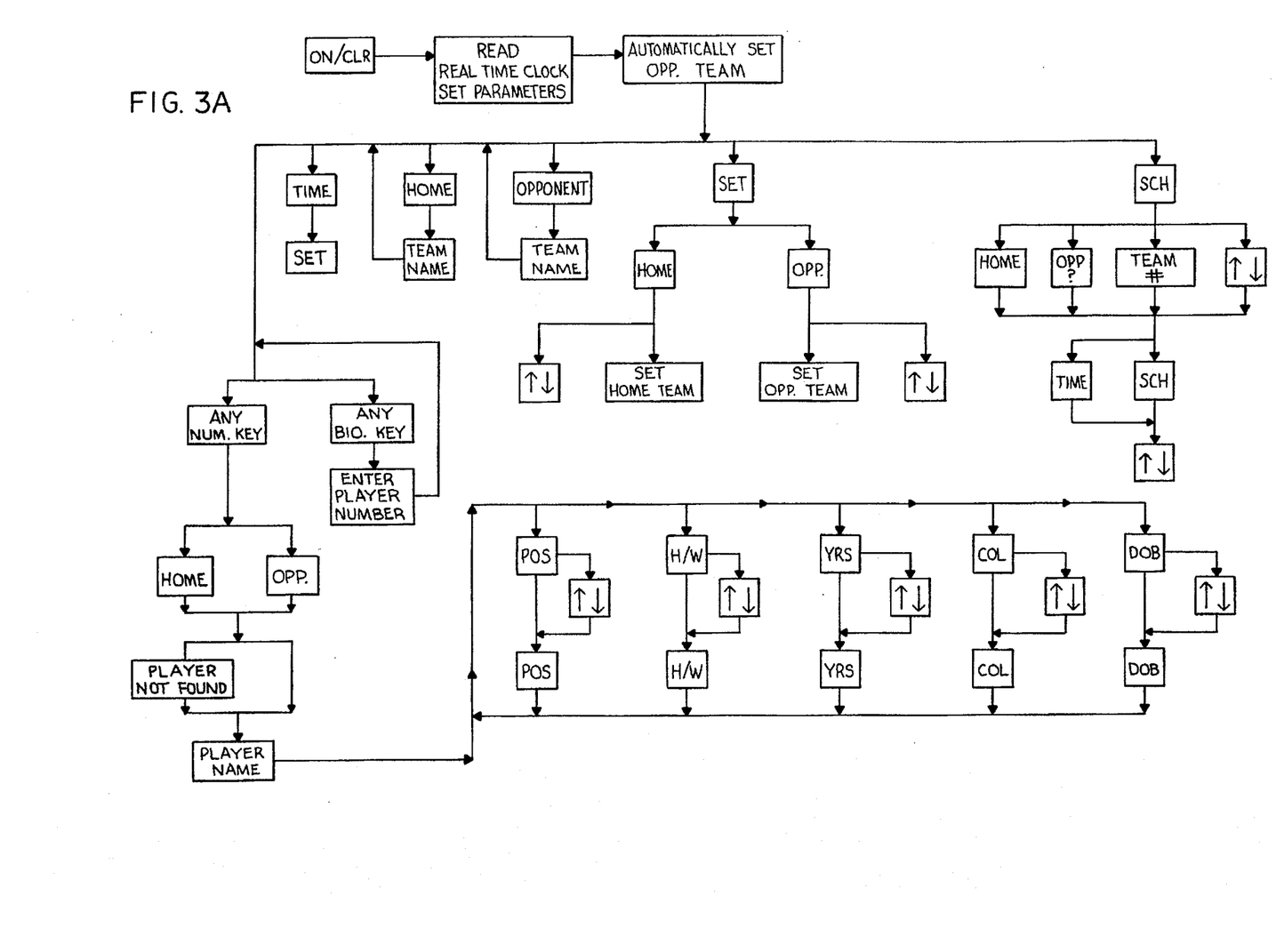
FIG. 3A–B are user flow diagrams of the unit's operation.
Figure 3B:
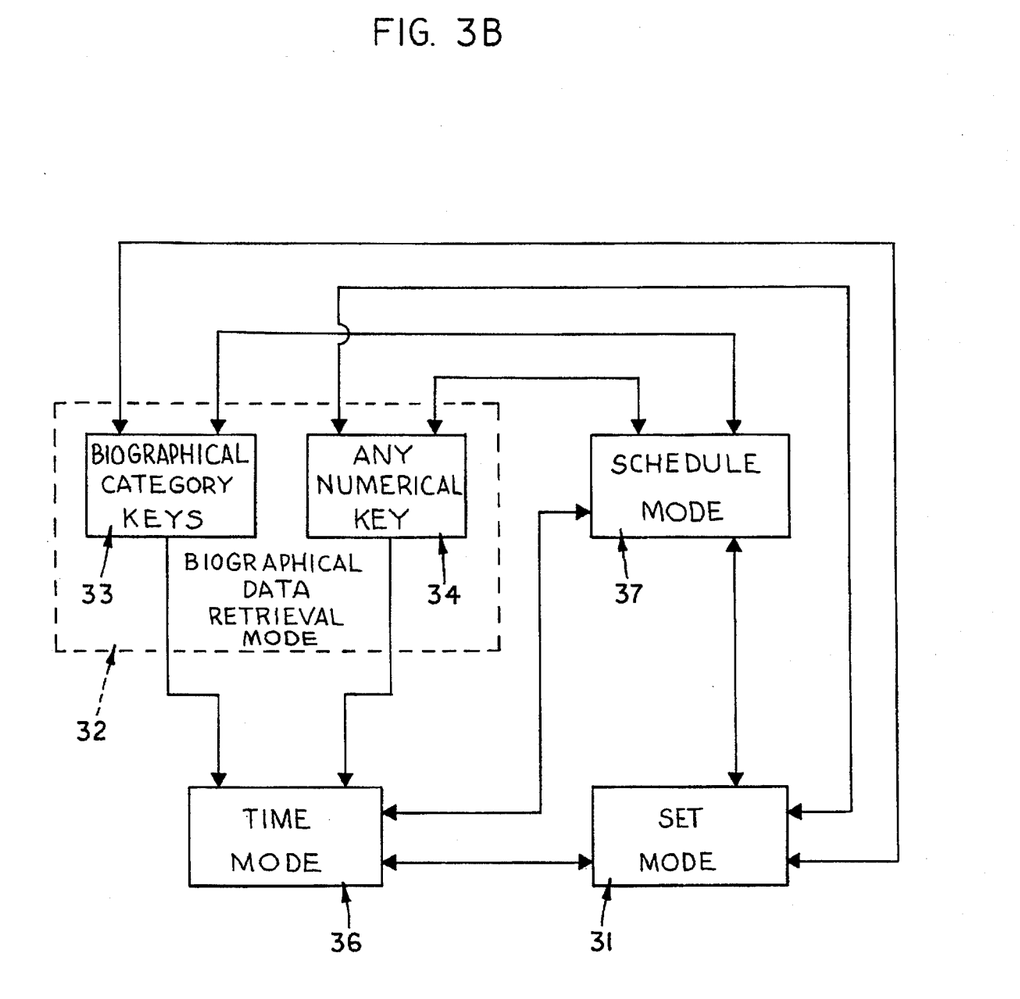

FIG. 1 shows a self-contained, battery operated, readily portable, hand-holdable electronic biographical data retrieval unit optimized for the football enthusiast. The unit contains a one line 20 character liquid crystal display (LCD) 11, a numeric keypad 12, and various function keys 13–29. Inclusive within these function keys, are system function control keys of time 16, schedule 17, and set 22. Actuation of one of the numeric keys on the numeric keypad 12 or any of the biographical category keys 24–29 also constitutes a system function control sequence as illustrated in FIGS. 3A and 3B. In general the unit will operate without frequent battery replacement, the keys will be tactile and responsive, the LCD screen will be highly visible to the user, and the unit will be very light and easily able to fit into a shirt or jacket pocket or the like. Later technical evolution of the device contemplates a slimmer credit card style design which may be disposable, but a disposable model would not significantly change the operation of the current function keys. Various insignias, such as league or individual team names or logos, may be strategically placed on the outside of the unit to increase attractiveness. Furthermore, a listing of all teams contained in the unit, each having assigned team code numbers is conspicuously located preferably on the back of the unit.

Figure 2A:
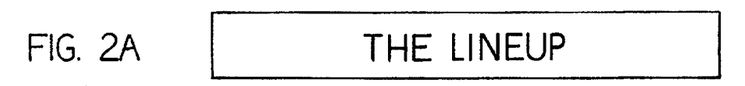
FIG. 2A–2J show an example sequential screen display.
Figure 2B:
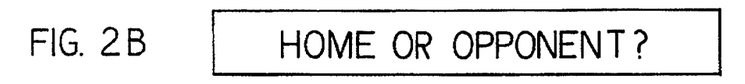
Figure 2C:
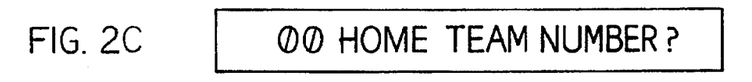
Figure 2D:
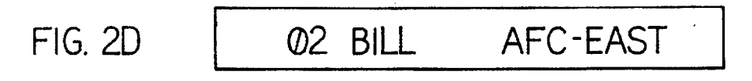
Figure 2E:
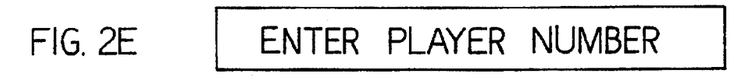
Figure 2F:
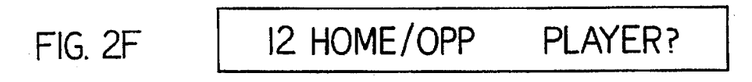
Figure 2G:
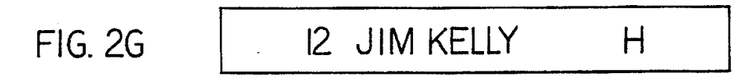
Figure 2H:
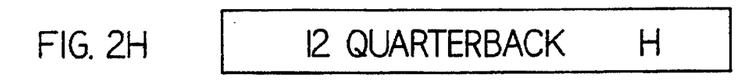
Figure 2I:
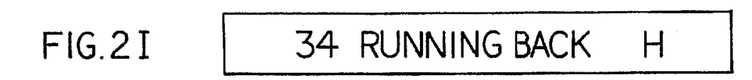
Figure 2J:
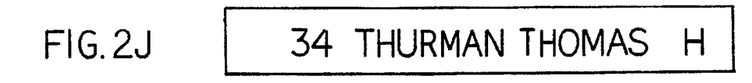

FIGS. 2A–2E show sequential screen displays of a user's typical retrieval of a player's name and biographical data obtained by the inputting of a player number. FIG. 3A is a user flow diagram illustrating the interrelation of the unit's function keys. Upon actuation of the on/clr key 19, the unit displays an initial message (FIG. 2A). Actuation of the set key 22, one of the system function control keys, places the user in the set home or opponent teams mode and requests the user to choose which team to set (FIG. 2B). The user then actuates the home key 21 or opponent key 23, and if the home key 21 is picked the unit asks the user to enter a desired team code number (FIG. 2C) through the numeric keypad 12. The back of the retrieval unit contains a listing of all team code numbers. The user inputs the code number of the desired home team, after inputting one or two digits, and the unit then displays the selected team's code number, abbreviated team name, the league, and division the team plays in (FIG. 2D). The user also has the option of inputting the home team by using the up 13 or down 14 scroll keys which allows the user to browse through a complete alphabetical team listing. In either method of choosing a team, the chosen home team displayed is placed into static memory and remains there, whether the unit is on or off, until changed by the user again through the set procedure. This saving operation is not user initiated, but is an integrated system procedure (see FIG. 4). Therefore, the user is not necessarily required upon each unit power-up to set or re-set a home team. A user's preferred home team may remain in home team memory indefinitely and a new opponent may be chosen. Typically, a user will then desire to reference a specific player's name and relevant biographical data. By actuating any of the numeric keys 12 and then any of the biographical data keys 24–29, the user is immediately routed into a biographical data retrieval mode (see FIG. 3A). Should the user prematurely press a biographical data key the unit displays a message instructing the user to first enter a player number (FIG. 2E). Upon actuating a numeric key, the user is requested to then choose from which team of players, home or opponent, the inputted player number should be referenced (FIG. 2F). A player number is the player's roster number and is typically also the player's jersey number. Once the home and opponent teams are selected, the unit retrieves a player's name and relevant biographical data matching the inputed roster number, or retrieves the closest player number (FIG. 2G). The retrieved player's initial record consists of the player's number, the player's name (with abbreviations if necessary), and whether the player is from the home or opposing team. Once a player's name has been retrieved, choosing any biographical data key will then display the designated data (e.g. FIG. 2H). Any biographical data key may be selected after any other biographical data key in any sequence. Also, the user may use the scroll keys 13–14 to browse through player data by a specific category. For example, once Jim Kelly's record is retrieved, and the user has chosen the position category (e.g., quarterback) from the biographical data keys, the user may then scroll up or down through successive team positions (FIG. 2I). This scrolling activity concurrently retrieves the subsequent player's biographical data file associated with the position scrolled to. Actuating the current category key once again displays the players name for that current record (FIG. 2J). All category data retrieved fits completely on the LCD. No additional scrolling is required.

The forgoing functions and other functions to be described hereinafter are accomplished using standard components logically integrated to achieve the specific ends of this apparatus, therefore the following figures are illustrative of the functional aspects of the device and the method employed in achieving the objects of the invention. The specific interconnection and choice of electronic components to achieve these objects is based on these logical considerations and is not considered to be a part of the invention apart from the logical consideration, it being within the ability of most computer engineers to connect the components electronically such that signals and data may be appropriately passed. More specifically, the present invention uses a central processing unit (cpu) having a static memory which is loaded with the data needed to provide the above displays. Electronic connection between the keyboard, central processing unit and display to provide signal paths, control and data transfer are well known in the art and are not described herein. Likewise, integrating the cpu with a real time clock and a set of buffers or other memory devices electronically is a matter within the skill of a competent electrical engineer and is not described herein. It is the utilization of these components in accordance with the teachings of the present invention that is allows the fan in the stands or at home to have rapid access to the data with a few key strokes rather than fumbling through a weekly published program or guide.

Data retrieval is accomplished by the central processing unit initiating a memory read signal to the unit's internal static memory at the appropriate memory location as determined by system software and user input. Data is sequentially read from the static memory, placed into the CPU's internal buffers, and sent to the display screen's decoding devices to display. The display screen is driven by screen circuitry and maintained until another user input necessitates a screen change.

In addition to name and biographical data retrieval, a user may also retrieve the team schedules of each team contained in the unit using the schedule, time and scroll keys. The information displayed includes the opponent, the date, day, time, and whether a particular game is at home or away (see FIG. 3A).

The unit's real-time system clock affects several system operations. Once set, the clock keeps track of the actual time, date, day of the week, and AM or PM designations. The real-time clock may be set by actuating the set key 22 after actuating the time key 16 (see FIG. 3A).

FIG. 3B illustrates the unit's ability to automatically reroute the current mode between system functions. By allowing the user to switch from one system function to another system function without additional key actuation, the units overall intuitive operation is significantly improved over prior art. Current devices on the market require the user to keep track of the current mode and memorize key stroke extraction procedures to alter the present mode. Referring to the diagram, a user may switch from set mode 31 to biographical data retrieval mode 32 via the biographical category keys 33 and back again. A user may switch from set mode 31 to time mode 36 directly, and a user may switch from set mode 31 to schedule mode 37 and back again. A user may switch from biographical data retrieval mode 32 to set mode 31 from any previous numeric key actuation directly. A user may switch from biographical data retrieval mode 32 to schedule mode 37 after actuation of any numeric key directly. A user may switch from time mode 36 to biographical data retrieval mode 32 and back again from either biographical category keys 33 or numeric keys 34. A user may switch from biographical data retrieval mode 32 via the biographical category keys 33 to schedule mode 37 and back again. Finally, a user may switch from time mode 36 to schedule mode 37 and back again, except after actuating the schedule key again after having chosen a team in schedule mode (see FIG. 3A). Actuating the time key at this point will display the scheduled game time. It should also be noted that actuating the set key after entering time mode 36 enables the user to enter the current date, day, and time, and does not reroute the user to set mode 31. In addition, actuating any numeric key 34 after entering schedule mode 37 does not reroute the user to biographical data retrieval mode 32. This is also true for setting the home or opponent teams in set mode 31 (see FIG. 3B).

FIGS. 4A–4I show the logical operation of several unique features of the unit. One advantage of the instant invention is the unit's integrated real time clock (see FIG. 4A). Upon the unit's wake-up 38 (turning the unit on, or activation), the microprocessor reads the real-time clock 39 and loads the date, day and time registers 41. After time register initialization, the microprocessor reads the unit's nonvolatile memory 42 and loads the previously selected home team. The microprocessor will then compare the current date from the registers with the home team's game schedule saved in the unit's static memory and automatically load the home team's next scheduled opponent in the current opponent memory location 43. Therefore, the user need not necessarily manually load the opposing team for the next game if the unit is activated on the actual date that a game has been scheduled. The opponent team may, however, be changed at any time after such activation if the user desires.

Figure 4A:
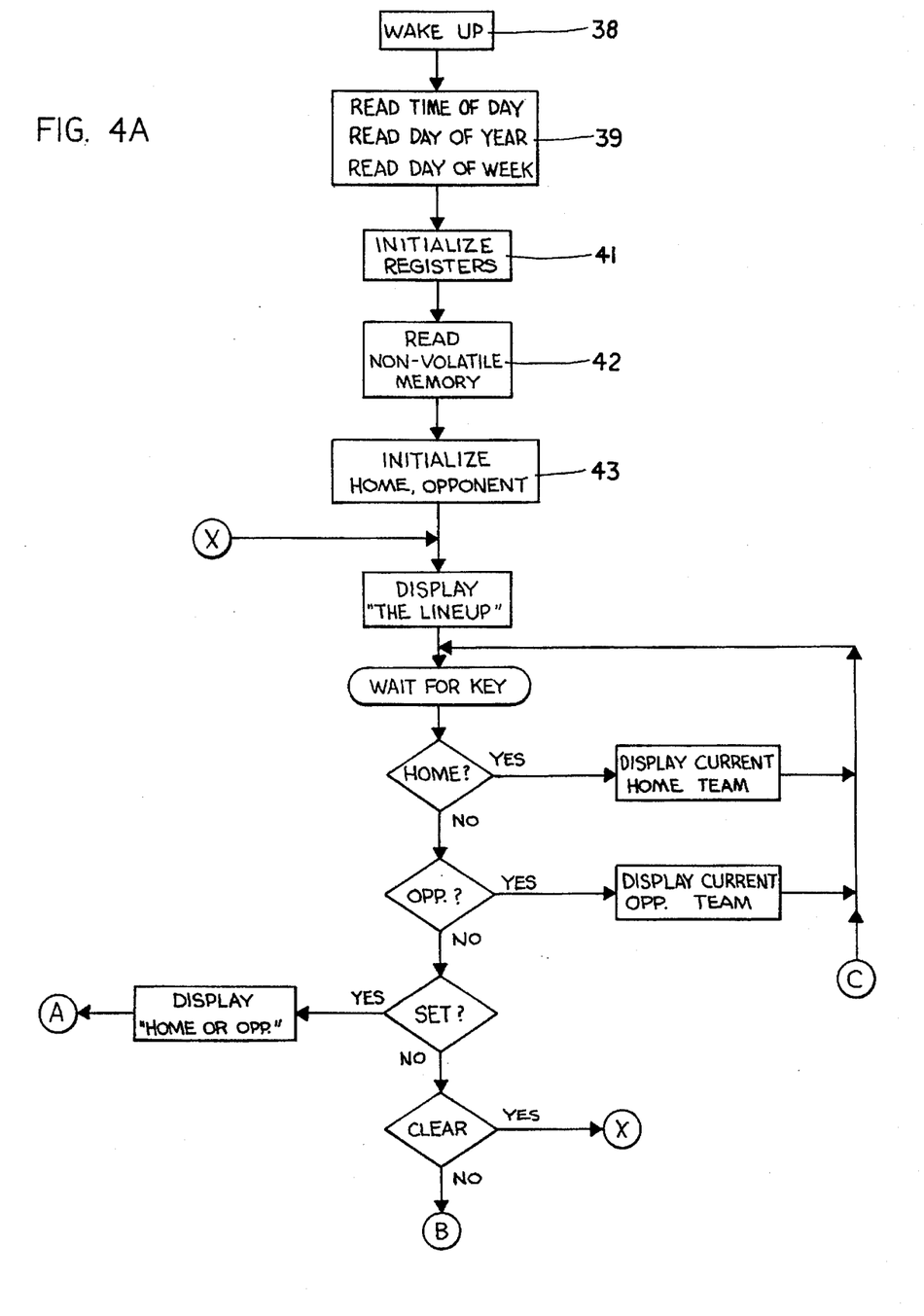
FIG. 4A–4I is a system software flow diagram.
Figure 4B:
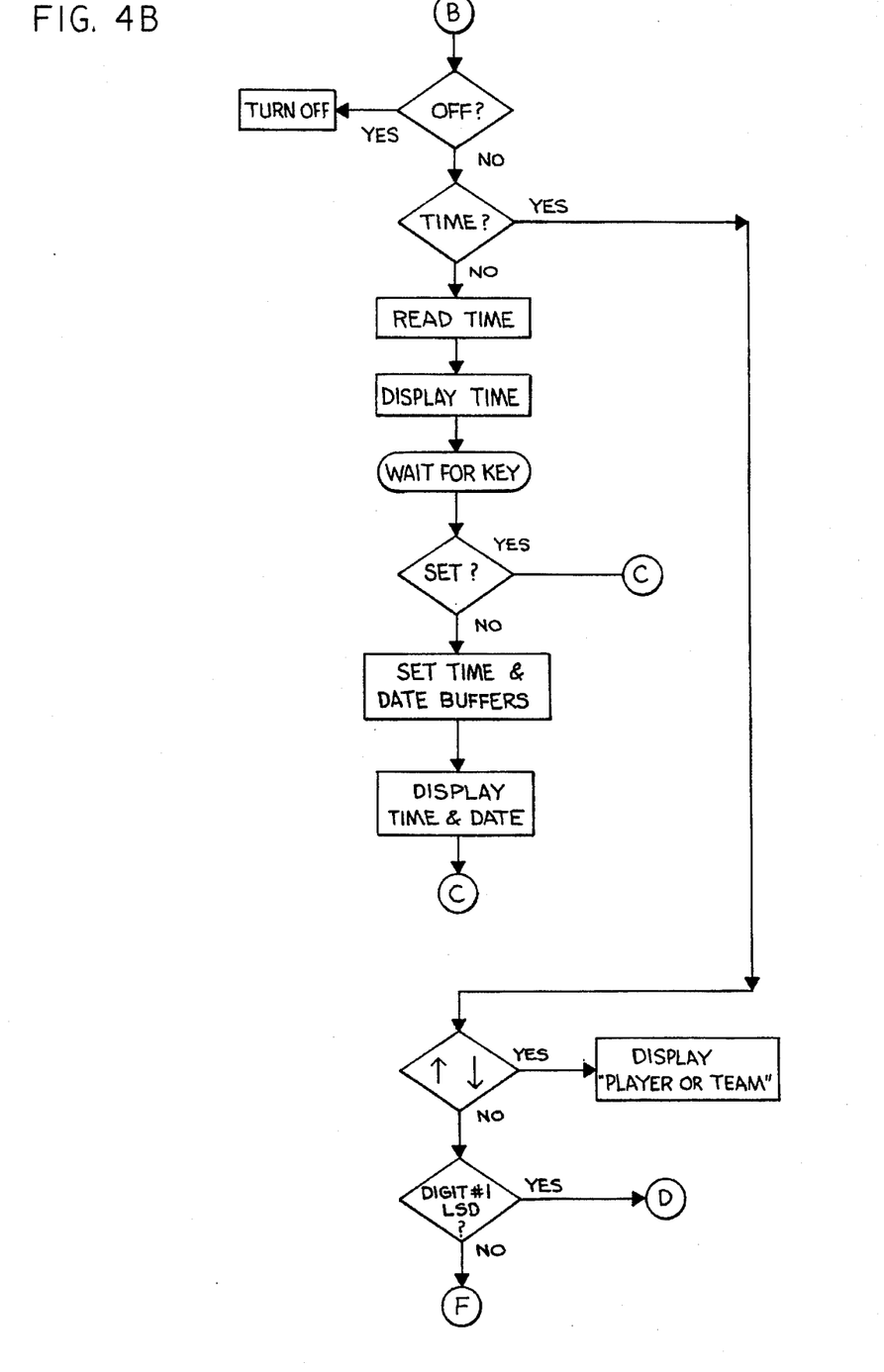
Figure 4C:
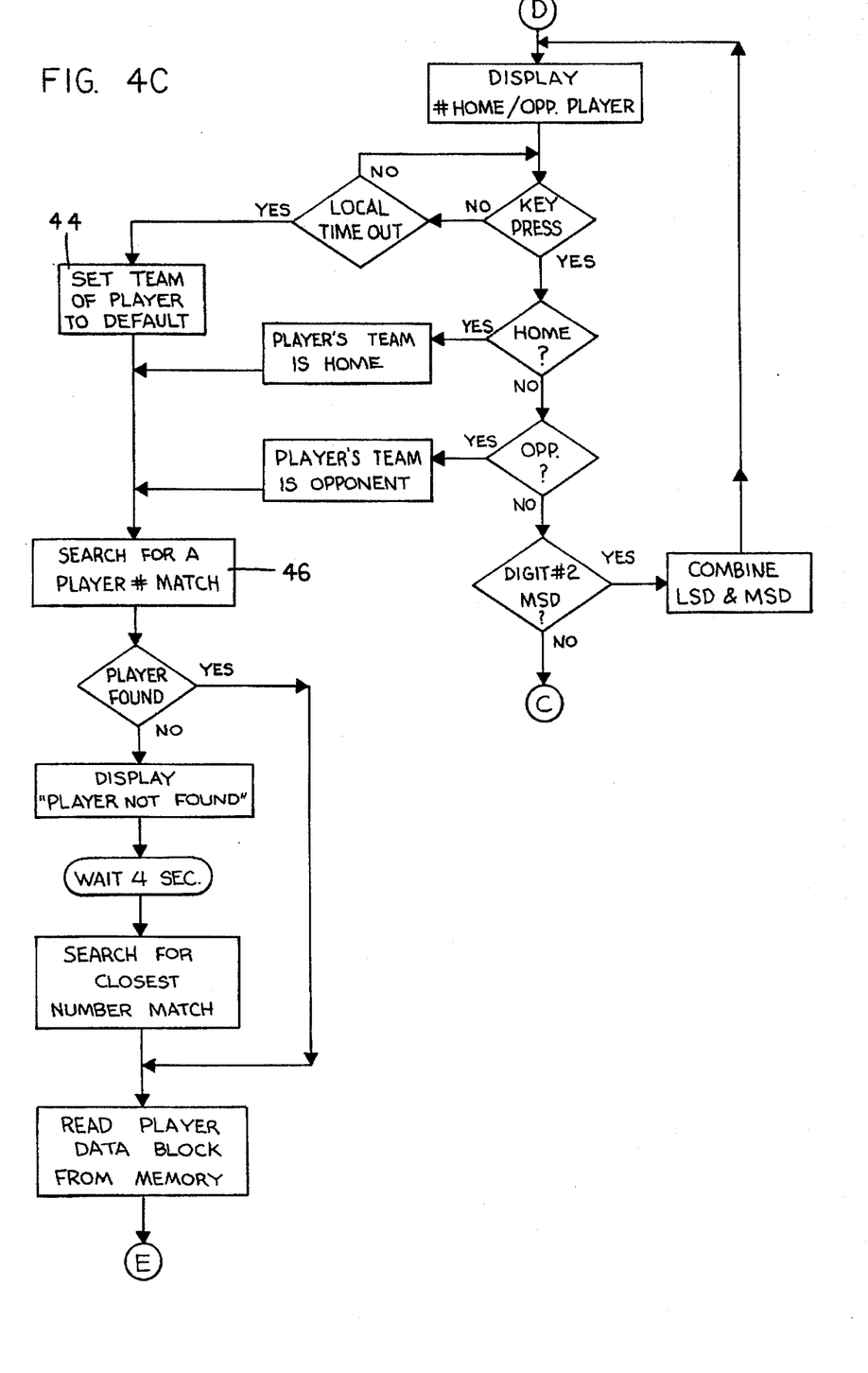

FIG. 4C shows a searching function logical block 46 that represents the devices ability to compare the input player number to those player numbers present in the unit's data memory. Upon finding a match in memory, the players data block is retrieved for display. If the inputed number is not found, then the unit retrieves the next higher player's data block number in sequence.

Figure 4D:
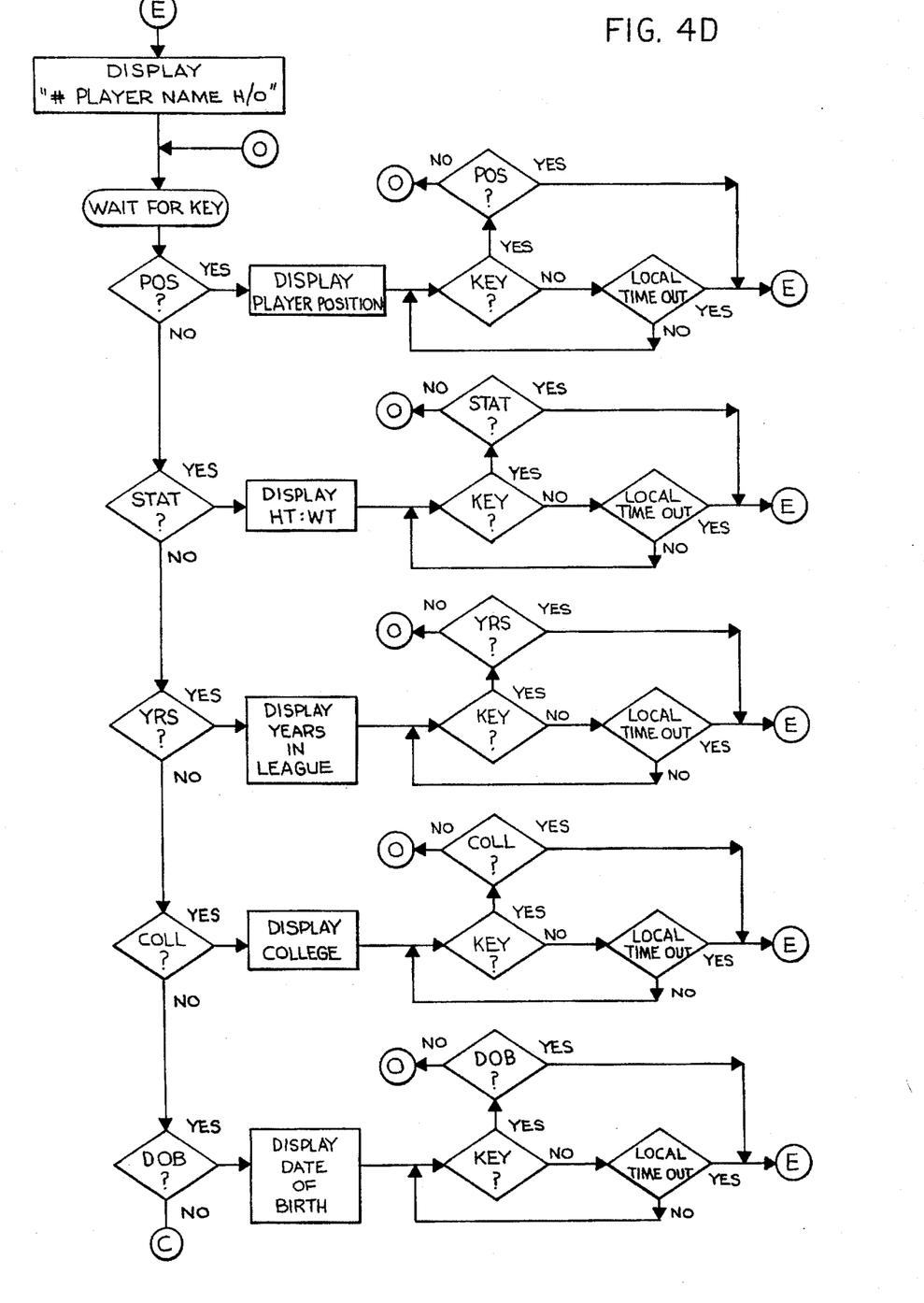
Figure 4E:
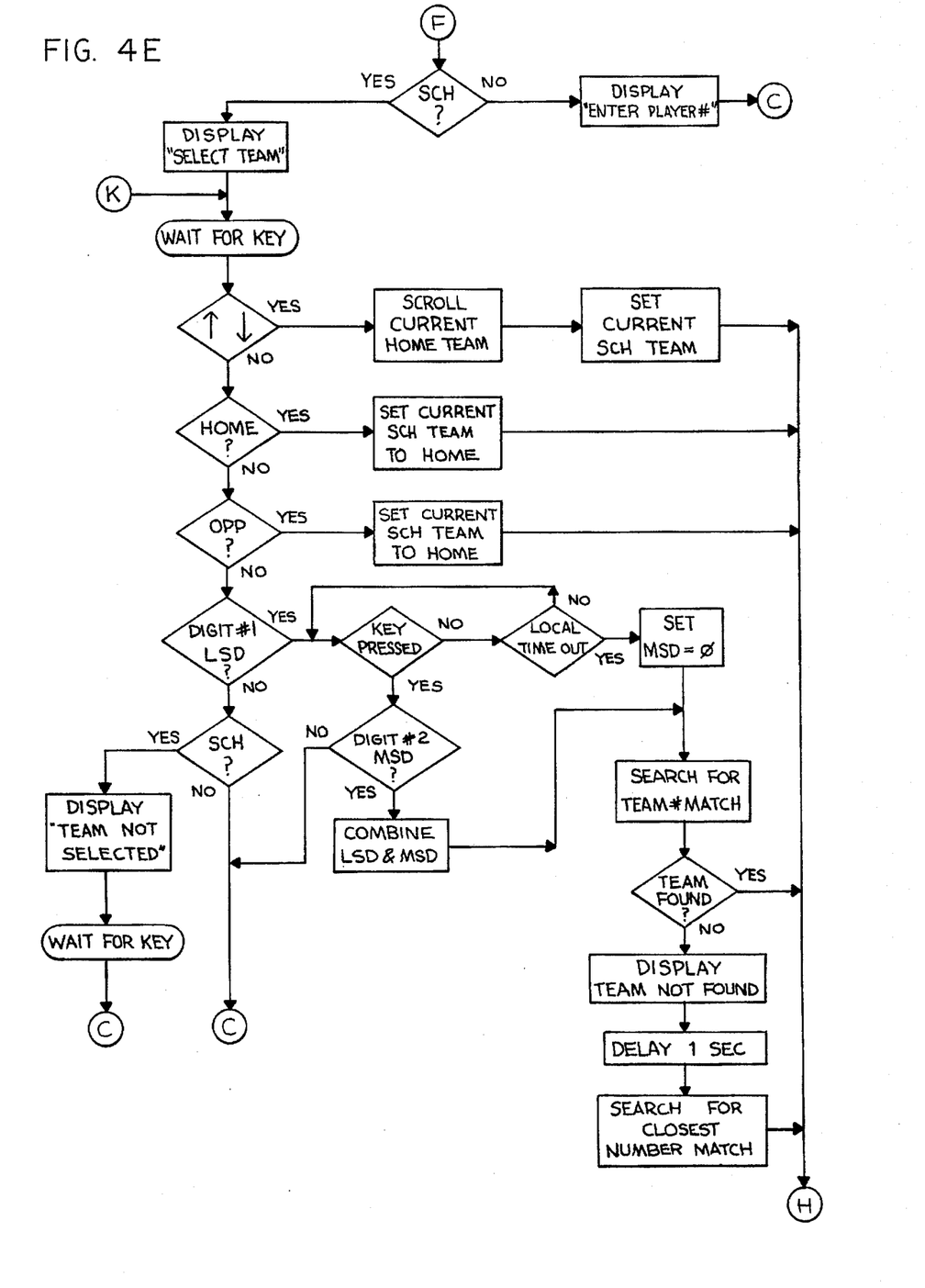
Figure 4F:
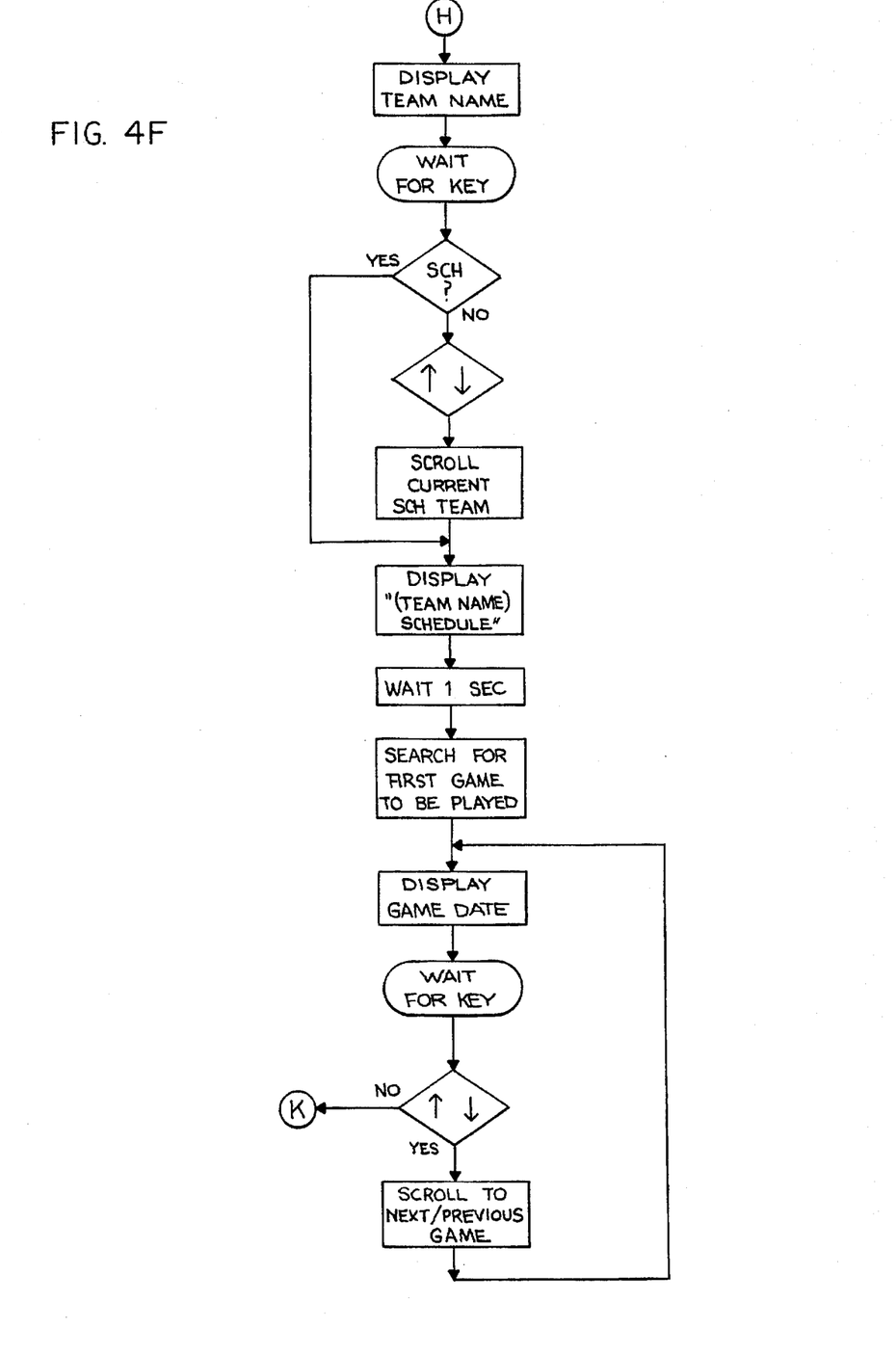
Figure 4G:
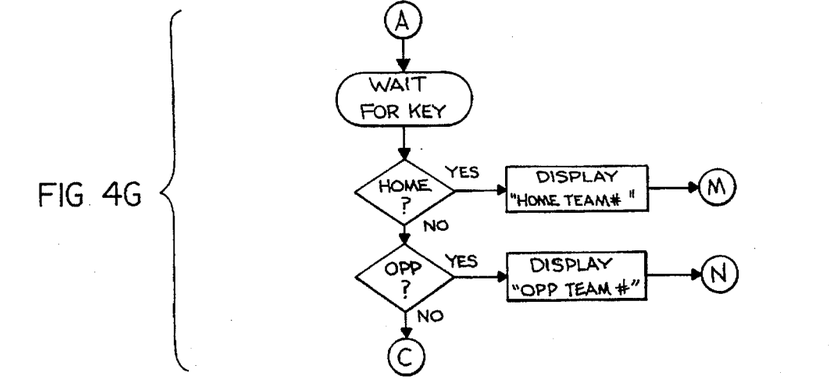
Figure 4H:
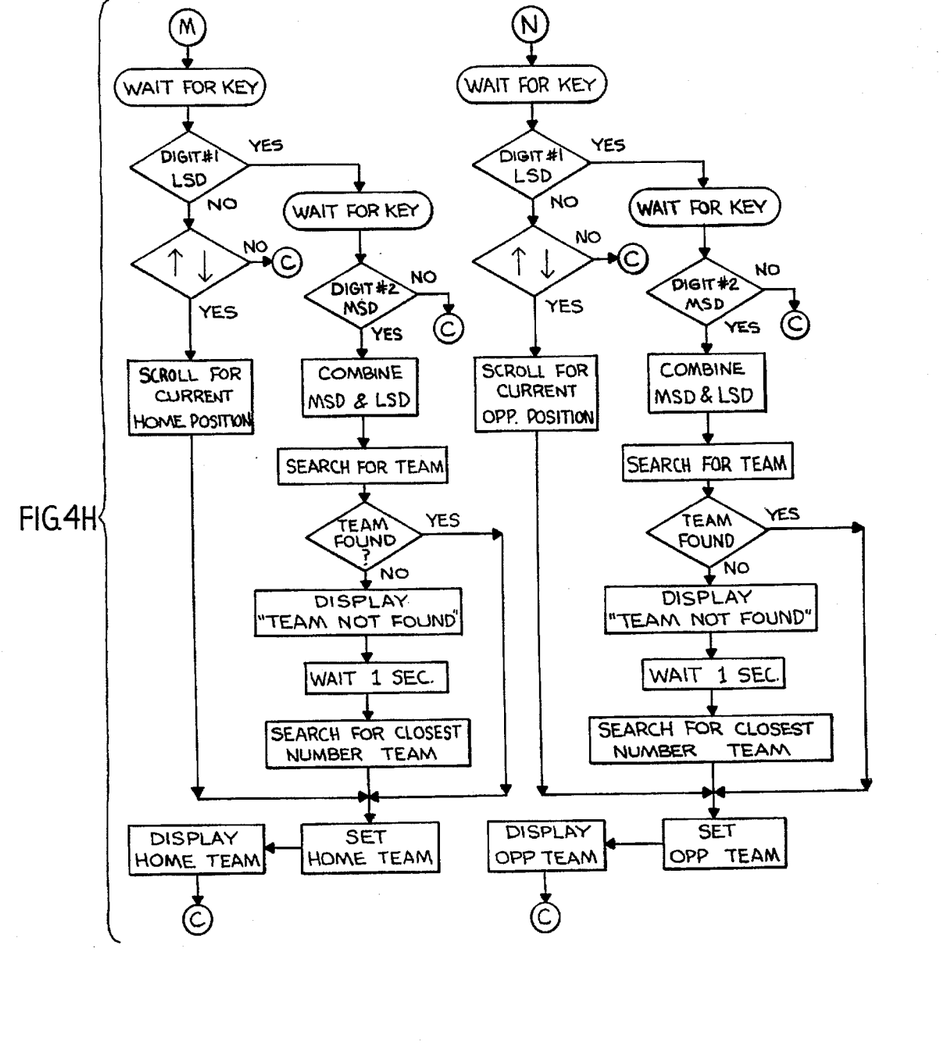

The invention also allows a user to switch from a home team player to an opponent team player while in biographical data retrieval mode. Referring to FIGS. 4C and 4D, a user who has retrieved a player's record may choose any biographical data category to view additional data (see FIG. 4C). However, the user may also actuate the home or opponent keys if he desires to retrieve corresponding data of the player on the other team who has the same player number as previously retrieved or has the same position as retrieved. This is called a "mirror image" function and is principally used to compare information of opposing players having the same player number or position. It may also be used when the user has chosen a correct player number, but mistakenly chosen the incorrect team side. From any logical point on FIG. 4D, the user will be immediately routed to the set team of player block 44, the opposite team will be set as the default, and searching and matching the player number will commence 46 (see FIG. 4C).

Figure 4I:
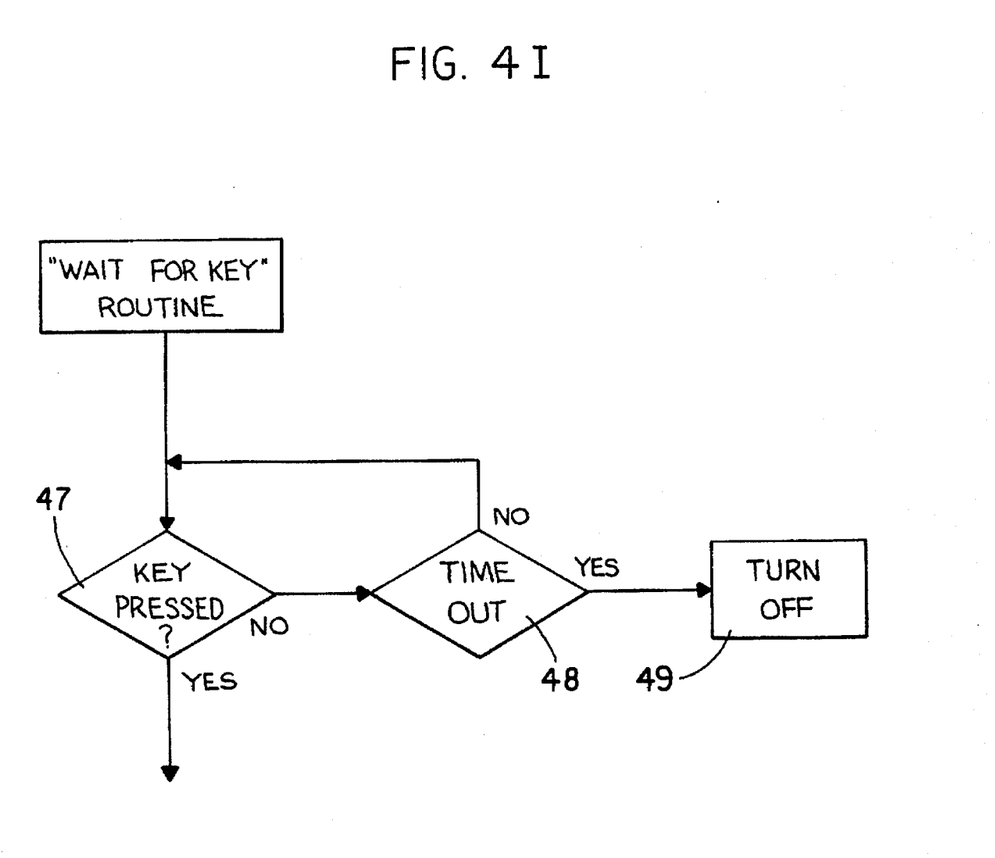

FIG. 4I illustrates the logical operation of the unit's ability to turn itself off. In any of the logical diagrams shown in FIGS. 4A–4H an internal timer begins counting at any "key pressed?" logical step 47. When a preset value has been reached 48, the microprocessor initiates a unit shut down 49. Since all essential values have been already saved, no essential data is lost. However, an automatic deactivation procedure will significantly extend the unit's useful battery life.

Because an important object of the current invention is to provide current player data, a player's biographical record and the teams' schedules will be downloaded into a field programmable memory device at a last stage of the unit's manufacture prior to customer distribution. Each block of data will be consolidated without compression within the memory. Devices typical of satisfying these requirements are an erasable programmable read only memory (EPROM), an electrically erasable programmable read only memory (EEPROM), a programmable read only memory (PROM), or other well known field programmable memory devices (FPLA). A read only memory (ROM) may also be used, in the alternative, for relatively constant data. However, use of a ROM device would probably require an additional FPLA for last minute updates. All memory devices are preferably manufactured in complimentary metal oxide semiconductor technology (CMOS) to conserve power. A static memory device, such as a CMOS static ram, is also incorporated to retain automatically saved values from user input or system computation.

The foregoing logical description is intended to provide an illustration of the logical functions of the apparatus and method of used to enable one of ordinary skill in the art to replicate the invention without undue experimentation. The scope of protection claimed for the invention is set forth in the accompanying claims and is not limited to the specific disclosure set forth herein above.

What is claimed is:

1. An electronic, hand-held, portable machine for retrieving biographical football player information, comprising:
   (a) a keypad having numerical keys 0–9, up and down scroll keys, a plurality of biographical data selection keys, and a plurality of system function control keys;
   (b) biographical means for storing names and biographical data on sports players by uniform number and team;
   (c) schedule means for storing a playing schedule of a team;
   (d) a display screen to show user system status and retrieved data;
   (e) a programmed central processing unit having
      (i) means responsive to activation of said machine for reading a real-time clock and initializing date dependant parameters;
      (ii) means responsive to said machine activation for initializing said system functions with date, time, day, home team, and opponent team data;
      (iii) means responsive to deactivation of said machine for saving chosen said home and opponent teams;
      (iv) means responsive to any system function control key for causing immediate function mode transfer upon actuation of any key in a different function mode;
      (v) means responsive to said numerical keys for retrieving said football player biographical data;
      (vi) means responsive to actuation of said biographical data selection keys for retrieving said biographical data; and
      (vii) means responsive to said retrieval means for controlling said display screen and displaying said retrieved biographical data.

2. An electronic, hand-held, portable machine as recited in claim 1, wherein said central processing unit including means for initiating an automatic deactivation procedure after an elapse of a set amount of time.

3. An electronic, hand-held, portable machine as recited in claim 1, wherein said system function control keys are comprised of any numeric key, a time display/edit key, a set key, and a schedule key.

4. An electronic, hand-held, portable machine as recited in claim 1, wherein said means responsive to said numerical keys for retrieving said football player's name and biographical data includes means for comparing an inputed number to an assigned player number for a selected team and selecting biographical data for a player's number nearest to said inputed player number.

5. An electronic, hand-held, portable machine as recited in claim 1, further comprising two scroll keys operatively connected to said central processing unit to toggle said schedule memory to sequentially display a chosen team's schedule.

6. An electronic, hand-held, portable machine as recited in claim 5, further comprising:
   (a) roster means for storing a team player roster;
   (b) list means for storing a league team list; and
   (c) means for retrieving said player roster and said league list.

7. An electronic, hand-held, portable machine as recited in claim 6, further comprising two scroll keys operatively connected to said central processing unit to toggle said player roster and said league list memory to sequentially display said roster and said league list.

8. An electronic, hand-held, portable machine as recited in claim 5, wherein said scroll keys are further adapted for toggling through a chosen biographical category within said chosen team.

9. An electronic, hand-held, portable machine as recited in claim 1, further comprising means for switching from said home team to said opponent team after retrieving said player's name and biographical data whereby said switching displays an opponent's corresponding numerical player.

10. An electronic, hand-held, portable machine as recited in claim 9, wherein said switching is from said opponent team to said home team.

11. An electronic, hand-held, portable machine as recited in claim 1, wherein said initialization includes automatically setting of said opponent team if said home team has a game scheduled for that day.

12. An electronic, hand-held, portable machine as recited in claim 1, wherein said football player's biographical data categories comprise a player's name, a player's position, a player's height/weight, a player's number of years in professional football, a player's college, and a player's birth date.

13. An electronic, hand-held, portable machine as recited in claim 1, wherein said display is composed of liquid crystal.

14. An electronic, hand-held, portable machine as recited in claim 1, wherein said means for storing said biographical data comprises a field programmable memory chip.

15. An electronic, hand-held, portable machine as recited in claim 1, wherein said machine is disposable.

16. An electronic, hand-held, portable machine as recited in claim 1, wherein said central processing unit has a means for an automatic shut-off procedure after an elapse of a set amount of time.

17. An electronic, hand-held, portable machine as recited in claim 1, wherein said system function control keys consist of any numeric key, a time display/edit key, a set key, a schedule key, and a home/opponent key.

18. An electronic, hand-held, portable machine as recited in claim 1, wherein said means responsive to said numerical keys for retrieving said player's name and biographical data includes means for comparing an inputed number to an assigned player number for a selected team and selecting biographical data for a player's number nearest to said inputed player number.

19. An electronic, hand-held, portable machine as recited in claim 1, further comprising two scroll keys operatively connected to said central processing unit to toggle said schedule memory to sequentially display a chosen team's seasonal schedule.

20. An electronic, hand-held, portable machine as recited in claim 19, further comprising:
   (a) roster means for storing a team player roster;
   (b) list means for storing a league team list; and
   (c) means for retrieving said player roster and said league list.

21. An electronic, hand-held, portable machine as recited in claim 20, further comprising two scroll keys operatively connected to said central processing unit to toggle said player roster and said league list memory to sequentially display said roster and said league list.

22. An electronic, hand-held, portable machine as recited in claim 19, wherein said scroll keys are further adapted for toggling through a chosen biographical category within said chosen team.

23. An electronic, hand-held, portable machine as recited in claim 1, further comprising means for switching from said home team to said opponent team after retrieving said player's biographical data whereby said switching displays an opponent's corresponding numerical player.

24. An electronic, hand-held, portable machine as recited in claim 23, wherein said switching is from said opponent team to said home team.

25. An electronic, hand-held, portable machine as recited in claim 21, wherein said initialization includes automatically setting said opponent team if said home team has a game scheduled for that day.

26. An electronic, hand-held, portable machine as recited in claim 1, wherein said player's biographical data categories comprise a player's name, a player's position, a player's height/weight, a player's number of years in professional football, a player's college, and a player's birth date.

27. An electronic, hand-held, portable machine as recited in claim 1, wherein said display is composed of liquid crystal.

28. An electronic, hand-held, portable machine as recited in claim 1, wherein said means for storing said biographical data comprises a field programmable memory chip.

29. An electronic, hand-held, portable machine as recited in claim 1, wherein said machine is disposable.

30. An electronic, hand-held, portable machine for retrieving biographical sports information, comprising:
  (a) a keypad having numerical keys 0–9, up and down scroll keys, a plurality of biographical data selection keys, and a plurality of system function control keys;
  (b) biographical means for storing names and biographical data on sports players by uniform number and team;
  (c) schedule means for storing a playing schedule of a team;
  (d) a display screen to show user system status and retrieved data;
  (e) a programmed central processing unit having
    (i) means responsive to activation of said machine for reading a real-time clock and initializing date dependant parameters;
    (ii) means responsive to said machine activation for initializing said system functions with date, time, day, home team, and opponent team data;
    (iii) means responsive to deactivation of said machine for saving chosen said home and opponent teams;
    (iv) means responsive to any system function control key for causing immediate function mode transfer upon actuation of any key in a different function mode;
    (v) means responsive to said numerical keys for retrieving said player biographical data;
    (vi) means responsive to actuation of said biographical data selection keys for retrieving said biographical data; and
    (vii) means responsive to said retrieval means for controlling said display screen and displaying said retrieved biographical data.

31. Method for identifying team players on the opponent teams at a sporting event based on the numeric designation on the players' uniform, utilizing a hand held electronic display device having an internal memory into which data associated with each player and team has been stored, programmable means for retrieving said data and displaying the same, and means for allowing a human to interface with the display device comprising the steps of:
  (a) storing in said internal memory the relevant statistical or biographical data for each player on each team to be retrieved;
  (b) storing a season schedule for each team for which the unit is to be used in conjunction with;
  (c) providing a date to said programmable means;
  (d) comparing the provided date to the stored season schedule to determine the opponent teams in the next scheduled event occurring on or after the provided date and displaying the scheduled opponent team;
  (e) providing a number to said programmable means;
  (f) correlating the provided number with said data stored in said memory to determine the player having a corresponding number on the displayed team and displaying the determined players name and number;
  (g) selectively scrolling through the data stored in said memory to retrieve and display bibliographic information on the determined player; and
  (h) iteratively providing team and player selection commands to retrieve and display information on other players.

* * * * *